United States Patent
Ichikawa

(10) Patent No.: US 9,698,629 B2
(45) Date of Patent: Jul. 4, 2017

(54) WIRELESS POWER TRANSMISSION SYSTEM, POWER TRANSMITTING DEVICE, AND POWER RECEIVING DEVICE

(71) Applicant: MURATA MANUFACTURING CO., LTD., Nagaokakyo-Shi, Kyoto-Fu (JP)

(72) Inventor: Keiichi Ichikawa, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 904 days.

(21) Appl. No.: 13/874,607

(22) Filed: May 1, 2013

(65) Prior Publication Data
US 2014/0152122 A1    Jun. 5, 2014

Related U.S. Application Data

(63) Continuation of application No. PCT/JP2011/078242, filed on Dec. 7, 2011.

(30) Foreign Application Priority Data

Dec. 24, 2010    (JP) ................................. 2010-287012

(51) Int. Cl.
*H02J 17/00*    (2006.01)
*H02J 7/02*    (2016.01)
*H02J 7/00*    (2006.01)

(52) U.S. Cl.
CPC ............ *H02J 17/00* (2013.01); *H02J 7/0042* (2013.01); *H02J 7/025* (2013.01); *H02J 7/0044* (2013.01)

(58) Field of Classification Search
None
See application file for complete search history.

(56) References Cited

U.S. PATENT DOCUMENTS

| 7,834,860 | B2 | 11/2010 | Muranaka |
| 8,847,432 | B2 | 9/2014 | Camurati et al. |

(Continued)

FOREIGN PATENT DOCUMENTS

| CN | 101055507 A | 10/2007 |
| CN | 101803222 A | 8/2010 |

(Continued)

OTHER PUBLICATIONS

Written Opinion and International Search Report issued in PCT/JP2011/078242, mailed Mar. 13, 2013.

*Primary Examiner* — Jared Fureman
*Assistant Examiner* — Aqeel Bukhari
(74) *Attorney, Agent, or Firm* — Arent Fox LLP

(57) ABSTRACT

In a power transmitting device constituting a wireless power transmission system, a voltage generating circuit applies a voltage between an active electrode and a passive electrode. In a power receiving device, a voltage generated between an active electrode that is opposed to the active electrode, and a passive electrode that is opposed to or brought into contact with the passive electrode when the power receiving device is placed on the power transmitting device is inputted to a load circuit as a power supply voltage. Passive electrodes of the power transmitting device are provided to electrostatically shield the opposed active electrodes with respect to the earth. Consequently, a wireless power transmission system, a power transmitting device, and a power receiving device are configured so the potential of the power transmitting device and the power receiving device during power transmission is stabilized to thereby prevent malfunction of the power receiving device.

16 Claims, 14 Drawing Sheets

(56) References Cited

U.S. PATENT DOCUMENTS

| | | | |
|---|---|---|---|
| 2009/0091212 A1 | 4/2009 | Ripoll et al. | |
| 2009/0206675 A1* | 8/2009 | Camurati | H02J 17/00 307/104 |
| 2011/0234019 A1* | 9/2011 | Camurati | H02J 17/00 307/149 |
| 2012/0038218 A1* | 2/2012 | Ichikawa | H02J 5/005 307/97 |
| 2012/0299392 A1 | 11/2012 | Ichikawa et al. | |

FOREIGN PATENT DOCUMENTS

| | | |
|---|---|---|
| EP | 2 413 470 A2 | 2/2012 |
| JP | 08-263610 A | 10/1996 |
| JP | 2001-256449 A | 9/2001 |
| JP | 2006-353094 A | 12/2006 |
| JP | 2008-131812 A | 6/2008 |
| JP | WO 2009024731 A2 * 2/2009 ............. H02J 17/00 |
| JP | 2009-531009 A | 8/2009 |
| JP | 2009-534009 A | 9/2009 |
| JP | 2010-537613 A | 12/2010 |
| WO | WO 2010/150317 A1 | 12/2010 |
| WO | WO 2011/148803 A1 | 12/2011 |

* cited by examiner

PRIOR ART

US 9,698,629 B2

WIRELESS POWER TRANSMISSION SYSTEM, POWER TRANSMITTING DEVICE, AND POWER RECEIVING DEVICE

The present application is a continuation of PCT/JP2011/078242 filed Dec. 7, 2011, which claims priority to Japanese Patent Application No. 2010-287012, filed Dec. 24, 2010, the entire contents of each of which are incorporated herein by reference.

FIELD OF THE INVENTION

The present invention relates to a wireless power transmission system that transmits power from a power transmitting device to a power receiving device placed on the power transmitting device, a power transmitting device, and a power receiving device.

BACKGROUND OF THE INVENTION

As an example of typical known wireless power transmission systems, there is a power transmission system of a magnetic field coupling type which transmits power from the primary coil of a power transmitting device to the secondary coil of a power receiving device by using a magnetic field. When transmitting power by magnetic field coupling in this system, the magnitude of the magnetic flux passing through each coil greatly affects the electromotive force, and therefore high accuracy is required for the relative positions of the primary coil and secondary coil. Moreover, use of coils makes it difficult to achieve a reduction in device size.

A wireless power transmission system of an electric field coupling type as disclosed in Patent Document 1 is also known. In this system, power is transmitted from the coupling electrode of a power transmitting device to the coupling electrode of a power receiving device via an electric field. With this method, the accuracy required for the relative positions of the coupling electrodes is relatively low, and also the coupling electrodes can be reduced in size and thickness.

FIG. 1 illustrates the basic configuration of the power transmission system disclosed in Patent Document 1. This power transmission system includes a power transmitting device and a power receiving device. The power transmitting device includes a high-frequency high-voltage generating circuit 1, a passive electrode 2, and an active electrode 3. The power receiving device includes a high-frequency high-voltage load circuit 5, a passive electrode 7, and an active electrode 6. When the active electrode 3 of the power transmitting device and the active electrode 6 of the power receiving device are brought into close proximity to each other with an air gap 4 therebetween, these two electrodes are electric-field coupled to each other, forming a strong electric field between the electrodes, thereby enabling power transmission with high transmission efficiency.

Patent Document 1: Japanese Unexamined Patent Application Publication (Translation of PCT Application) No. 2009-531009

As an example of this power receiving device, there are electronic equipment or the like such as a cellular phone or a personal digital assistant (PDA). In recent years, a capacitive input section (touch panel) that offers good operability is increasingly used for the electronic equipment or the like. In this case, there may be situations where the power receiving device is placed on the power transmitting device, and the touch panel is operated while charging the power receiving device. At this time, as described above, the electric field formed between the active electrodes of the power transmitting device and power receiving device may cause fluctuations in potential, resulting in malfunction of the touch panel.

SUMMARY OF THE INVENTION

Accordingly, it is an object of the present invention to provide a wireless power transmission system, a power transmitting device, and a power receiving device, in which the potential of each of the power transmitting device and the power receiving device during transmission of power from the power transmitting device to the power receiving device is stabilized to thereby prevent malfunction of the power receiving device.

A wireless power transmission system according to the present invention is a wireless power transmission system including a power transmitting device including a transmitting-side electrode, and a voltage generating circuit that applies a voltage to the transmitting-side electrode, and a power receiving device having a receiving-side electrode that is capacitively coupled to the transmitting-side electrode, a step-down circuit that decreases a voltage generated in the receiving-side electrode, and a load circuit to which an output voltage of the step-down circuit is inputted as a power supply voltage, characterized in that the power transmitting device or the power receiving device includes an electrostatic shielding section that electrostatically shields the transmitting-side electrode and the receiving-side electrode with respect to an earth.

According to this configuration, the electrodes are electrostatically shielded with respect to the earth. There are cases where the ground potential of each of the power transmitting device and the power receiving device fluctuates with respect to the earth potential. This may cause a component that operates with reference to the ground potential, for example, a touch panel to become inoperable, or may disturb the view on the display. Therefore, although a stray capacitance is formed between the electrodes and the earth in a case where the capacitively coupled electrodes are not electrostatically shielded, in order to prevent fluctuations of the ground potential, it is necessary to make the stray capacitance between the electrodes and the earth small. Accordingly, by electrostatically shielding the capacitively coupled electrodes with respect to the earth, it is possible to prevent a large stray capacitance from being formed between the electrodes and the earth. As a result, malfunction of the power receiving device during power transmission can be prevented.

The wireless power transmission system according to the present invention may be configured so that the transmitting-side electrode has a transmitting-side active electrode, and a transmitting-side passive electrode that has a lower potential than the transmitting-side active electrode, the receiving-side electrode has a receiving-side active electrode, and a receiving-side passive electrode that has a lower potential than the receiving-side active electrode, the transmitting-side active electrode and the receiving-side active electrode are opposed and capacitively coupled to each other with a gap therebetween, and the transmitting-side passive electrode and the receiving-side passive electrode are opposed to each other with a gap therebetween or brought into contact with each other.

According to this configuration, by electrostatically shielding the active electrodes that become a high voltage portion with respect to the earth, the ground potential of each of the power transmitting device and the power receiving device can be further stabilized, thereby further preventing malfunction of the power transmitting device or the power receiving device.

The wireless power transmission system according to the present invention may be configured so that the transmitting-side electrode has a first transmitting-side electrode and a second transmitting-side electrode, the receiving-side electrode has a first receiving-side electrode that is opposed to the first transmitting-side electrode, and a second receiving-side electrode that is opposed to the second transmitting-side electrode, the voltage generating circuit applies voltages that are opposite in phase to each other to the first transmitting-side electrode and the second transmitting-side electrode, and the step-down circuit decreases an output voltage from the first receiving-side electrode and the second receiving-side electrode.

According to this configuration, four electrodes at high voltage can be electrostatically shielded with respect to the earth.

The wireless power transmission system according to the present invention is preferably configured so that the electrostatic shielding section electrostatically shields the step-down circuit with respect to the earth.

According to this configuration, fluctuations of the ground potential due to voltage fluctuations in the voltage generating circuit can be reduced, thereby further preventing malfunction of the power transmitting device or the power receiving device.

The wireless power transmission system according to the present invention is preferably configured so that the electrostatic shielding section electrostatically shields the step-down circuit with respect to the earth.

According to this configuration, fluctuations of the ground potential due to voltage fluctuations in the step-down circuit can be reduced, thereby further preventing malfunction of the power transmitting device or the power receiving device.

The wireless power transmission system according to the present invention may be configured so that the power receiving device has a capacitive input section whose reference potential is set to a potential of the receiving-side passive electrode.

According to this configuration, an input operation is detected by detecting that connection to the earth has been made (a small current has flown) via the human body by touching the capacitive input section of the power receiving device. Therefore, by stabilizing the ground potential of each of the power transmitting device and the power receiving device during power transmission, even when the capacitive input section (touch panel) is operated during power transmission, connection to the earth made by touching the capacitive input section can be detected with reliability, thereby reducing malfunction of the power receiving device during touch panel operation.

The wireless power transmission system according to the present invention may be configured so that the electrostatic shielding section is the transmitting-side passive electrode or the receiving-side passive electrode.

According to this configuration, it is possible to reduce the number of components.

The wireless power transmission system according to the present invention may be configured so that the power receiving device has a front surface that is provided with the capacitive input section, a back surface that is parallel to the front surface, and a bottom surface that is adjacent to the front surface and the back surface, the receiving-side active electrode is provided along the bottom surface, the receiving-side passive electrode is provided along the back surface, the power transmitting device has a placing surface with which the bottom surface of the power receiving device is brought into surface contact, a backrest surface with which the back surface of the power receiving device is brought into surface contact, and a front surface that is opposed to the backrest surface across the placing surface, the transmitting-side active electrode is provided along the placing surface, the transmitting-side passive electrode is provided along the backrest surface and the front surface, and is provided on a side opposite to the placing surface across the transmitting-side active electrode, the transmitting-side active electrode is provided along the placing surface, and the transmitting-side passive electrode is provided along the backrest surface and the front surface, and is provided on a side opposite to the placing surface across the transmitting-side active electrode.

According to this configuration, the transmitting-side and receiving-side active electrodes can be electrostatically shielded by the transmitting-side passive electrode.

The wireless power transmission system according to the present invention may be configured so that the power receiving device has a front surface that is provided with the capacitive input section, a back surface that is parallel to the front surface, and a bottom surface that is adjacent to the front surface and the back surface, the receiving-side active electrode is provided along the back surface, the receiving-side passive electrode has a bottom-surface-side passive electrode that is provided along the bottom surface, and a back-surface-side passive electrode that is opposed to the back surface across the receiving-side active electrode, the power transmitting device has a placing surface with which the bottom surface of the power receiving device is brought into surface contact, and a backrest surface with which the back surface of the power receiving device is brought into surface contact, the transmitting-side active electrode is provided along the backrest surface, and the transmitting-side passive electrode has a placing-surface-side passive electrode that is provided along the placing surface, and a backrest-surface-side passive electrode that is opposed to the backrest surface across the transmitting-side active electrode.

According to this configuration, the transmitting-side and receiving-side active electrodes can be electrostatically shielded by the transmitting-side passive electrode.

The wireless power transmission system according to the present invention may be configured so that the power receiving device has a front surface that is provided with the capacitive input section, a back surface that is parallel to the front surface, and a bottom surface that is adjacent to the front surface and the back surface, the first receiving-side electrode and the second receiving-side electrode of the receiving-side active electrode are provided along the bottom surface or the back surface, the power transmitting device has a placing surface with which the bottom surface of the power receiving device is brought into surface contact, and a backrest surface with which the back surface of the power receiving device is brought into surface contact, and the first transmitting-side electrode and the second transmitting-side electrode of the transmitting-side active electrode are provided along the placing surface or the backrest surface.

According to this configuration, the transmitting-side and receiving-side active electrodes can be electrostatically shielded by the transmitting-side passive electrode.

According to the present invention, capacitively coupled electrodes are electrostatically shielded with respect to the earth by the electrostatic shielding section, thereby preventing malfunction of the touch panel or the like caused by fluctuations of the ground potential of each of the power transmitting device and the power receiving device from the earth potential during transmission of power.

DETAILED DESCRIPTION OF THE PREFERRED EMBODIMENTS OF THE INVENTION

Hereinafter, preferred embodiments of a wireless power transmission system according to the present invention will be described with reference to the drawings. The wireless power transmission system according to the present invention includes a power transmitting device and a power receiving device. The power receiving device is, for example, portable electronic equipment including a secondary battery. Examples of the portable electronic equipment include a cellular phone, a personal digital assistant (PDA), a portable music player, a notebook personal computer (PC), and a digital camera. The power transmitting device is a charging stand on which the power receiving device is placed to charge the secondary battery of this power receiving device.

Embodiment 1

Figure 1:
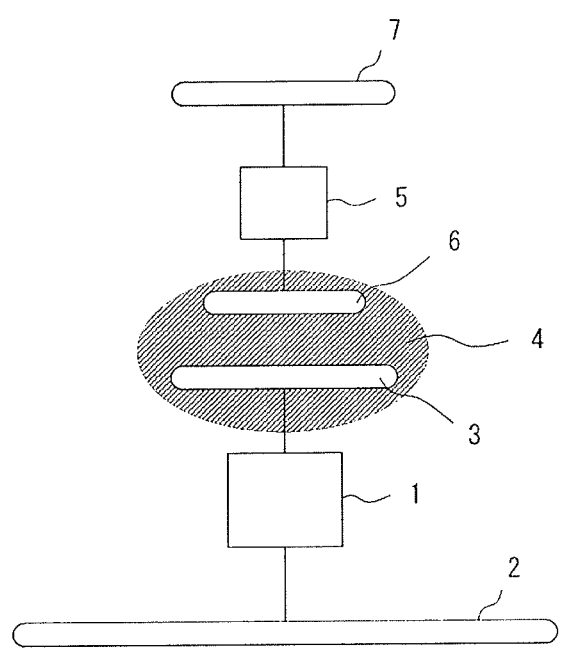
FIG. 1 illustrates the conventional configuration of a power transmission system disclosed in Patent Document 1.
Figure 2:
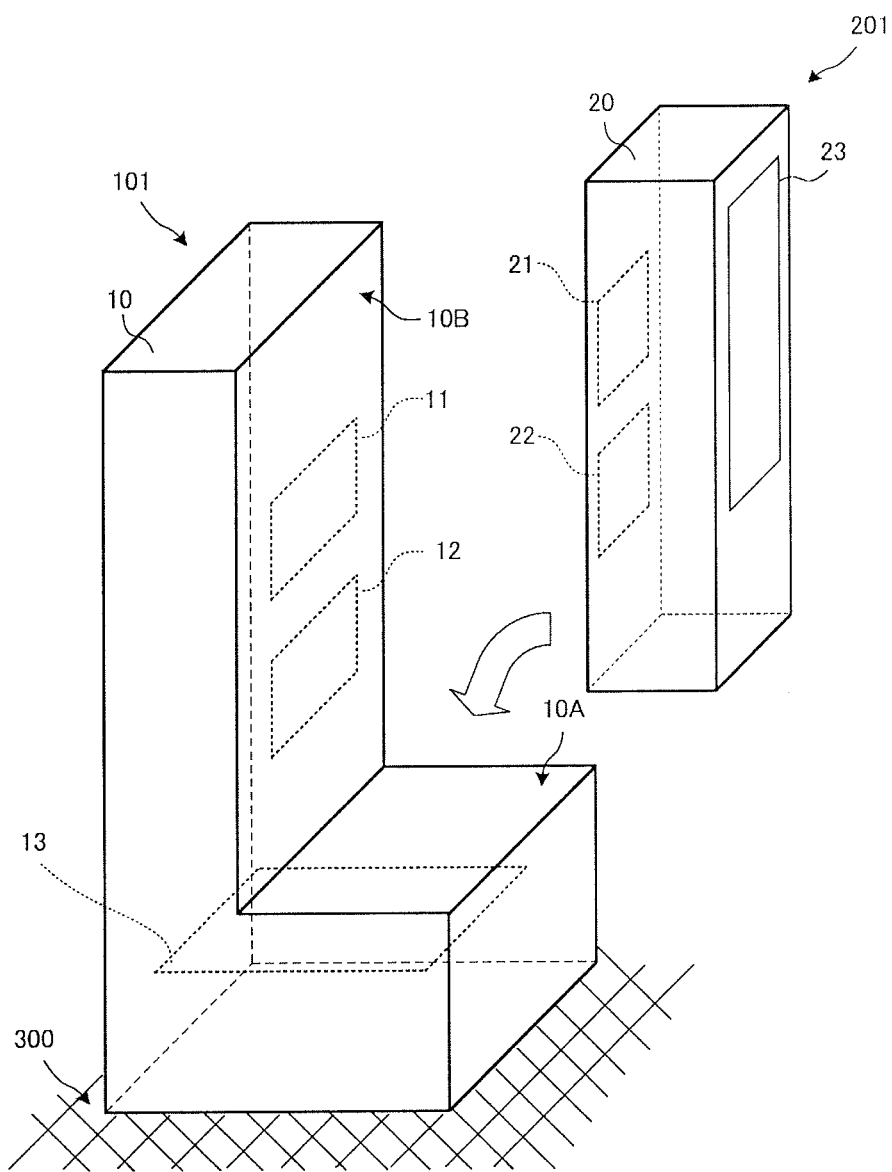
FIG. 2 is a perspective view of a power transmitting device and a power receiving device of a wireless power transmission system according to Embodiment 1.

FIG. 2 is a perspective view of a power transmitting device and a power receiving device of a wireless power transmission system according to Embodiment 1.

The power receiving device 201 includes a casing 20 having a substantially rectangular parallelepiped shape with a secondary battery (not illustrated) provided therein. Of the two opposite surfaces of the casing 20 which have the largest area, one is defined as front surface, and the other is defined as back surface. The casing 20 has a capacitive input section (hereinafter, referred to as touch panel) 23 provided along the front surface. The touch panel 23 is input means of the power receiving device 201. That is, the touch panel 23 is input means that combines a display function and a position input function, and with which the power receiving device 201 is operated by pressing the view on the screen.

The casing 20 has an active electrode 21 and a passive electrode 22 having a rectangular shape that are provided along the longitudinal direction of the back surface (hereinafter, referred to as height direction of the power receiving device 201). When the power receiving device 201 is placed on the power transmitting device 101, the active electrode 21 is opposed to an active electrode 11 described later, which is provided in the power transmitting device 101, with a gap therebetween, and the passive electrode 22 is opposed to a passive electrode 12 provided in the power transmitting device 101 with a gap therebetween. The passive electrode 22 may be partially or entirely exposed so as to be brought into direct electrical continuity with the passive electrode 12 on the power transmitting device 101 side.

The power transmitting device 101 has a casing 10 that is L-shaped in side view. The casing 10 has a placing surface 10A that is substantially horizontal with respect to the installation surface (earth), and a backrest surface 10B that is substantially perpendicular to the placing surface 10A, and is opposed to the placing surface 10A in parallel thereto. The placing surface 10A and the backrest surface 10B each have a rectangular shape. The power receiving device 201 is placed on the power transmitting device 101 so that the bottom surface of the power receiving device 201 is located on the placing surface 10A side, and the back surface of the power receiving device 201 is located on the backrest surface 10B side.

The casing 10 has the active electrode 11 and the passive electrode 12 having a rectangular shape that are provided along the longitudinal direction of the backrest surface 10B (hereinafter, referred to as height direction of the power receiving device 201). When the power receiving device 201 is placed on the power transmitting device 101, the active electrodes 11, 21 are opposed to each other with a gap therebetween, and the passive electrodes 12, 22 are opposed to each other with a gap therebetween.

The power transmitting device 101 includes an electrostatic shielding electrode 13 that is provided along the placing surface 10A. The electrostatic shielding electrode 13 is connected to a ground potential that is the reference potential of the power transmitting device 101. The electrostatic shielding electrode 13 has an oblong rectangular shape, and is provided in such a way that the active electrodes 11, 21 and the passive electrodes 12, 22, which are opposed to each other during power transmission, are located on the upper side of the electrostatic shielding electrode 13 with respect to the height direction of the power transmitting device 101. In other words, the electrostatic shielding electrode 13 is interposed between the active electrodes 11, 21 and passive electrodes 12, 22 that are opposed to each other, and the earth (the earth ground, a floor, a desk, or the like).

In the wireless power transmission system according to this embodiment, when transmitting power, the power receiving device 201 is placed on the power transmitting device 101, the passive electrodes 12, 22 are opposed to each other, and the active electrodes 11, 21 are opposed to each other. Then, a voltage is applied from a voltage generating circuit (not illustrated) to create an electric field between the opposed active electrodes 11, 21, and power is transmitted from the power transmitting device 101 to the power receiving device 201 via this electric field. Consequently, the secondary battery of the power receiving device 201 is charged.

As will be described later in detail, in this embodiment, it is possible to operate the touch panel 23 of the power receiving device 201 during power transmission operation. At this time, large fluctuations in the potential of the power transmission line during power transmission may cause malfunction of the touch panel 23. Accordingly, malfunction of the touch panel 23 can be prevented by electrostatically shielding the active electrodes 11, 21 that become a high voltage portion, with respect to the earth (the earth ground, a floor, a desk, or the like) by the electrostatic shielding electrode 13.

Hereinafter, the circuit configuration of the wireless power transmission system, and causes of malfunction of the power receiving device 201, which occurs when the power receiving device 201 is operated during power transmission operation, will be described in detail.

Figure 3:
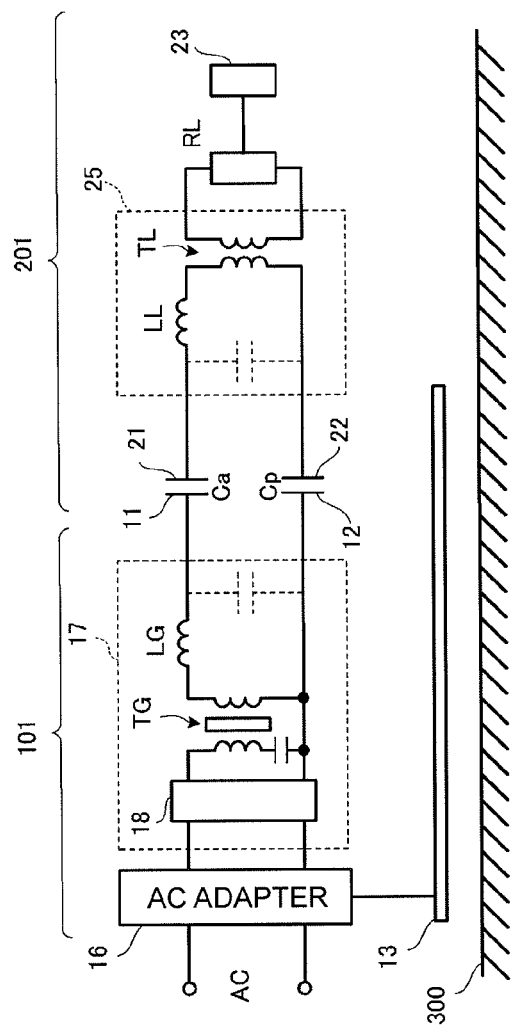
FIG. 3 is a schematic diagram illustrating an equivalent circuit of a wireless power transmission system when a power receiving device is placed on a power transmitting device.

FIG. 3 is a schematic diagram illustrating an equivalent circuit of the wireless power transmission system when the power receiving device 201 is placed on the power transmitting device 101.

The power transmitting device 101 includes an AC adapter 16 and a voltage generating circuit 17. The AC adapter 16 rectifies and converts an alternating-current voltage of 100 V into a direct-current voltage of 5V, 12V, or the like, and outputs the direct-current voltage to the voltage generating circuit 17. The voltage generating circuit 17 includes an inverter 18, a step-up transformer TG, and an inductor LG. The voltage generating circuit 17 converts the voltage inputted from the AC adapter 16 into an alternating-current voltage, increases the alternating-current voltage, and applies the alternating-current voltage between the active electrode 11 and the passive electrode 12. The frequency of the voltage applied is in a range of 100 kHz to 10 MHz.

A step-down circuit 25 including a step-down transformer TL and an inductor LL is connected between the active electrode 21 and passive electrode 22 of the power receiving device 201. A load circuit RL and the touch panel 23 are connected to the secondary side of the step-down transformer TL. The load circuit RL includes a rectifying and smoothing circuit and a secondary battery that are not illustrated. The touch panel 23 is driven with the secondary battery of the load circuit RL as a driving power source.

Figure 4:
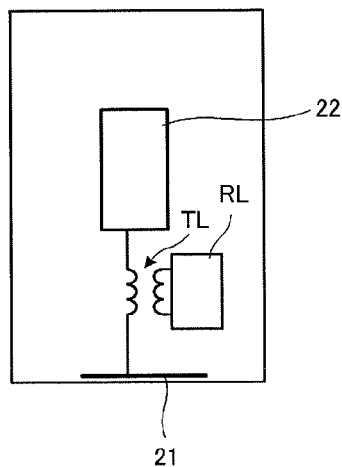
FIG. 4 is a schematic circuit diagram of a power receiving device.

FIG. 4 is a schematic circuit diagram of the power receiving device 201. The primary side of the step-down transformer TL is connected between the passive electrode 22 and the active electrodes 21. The load circuit RL is connected to the secondary side of the step-down transformer TL. In FIG. 4, the touch panel 23 is omitted.

Returning to FIG. 3, when the power receiving device 201 is placed on the power transmitting device 101, the active electrode 11 and the active electrode 21 are brought into close proximity to each other with a gap therebetween, forming a capacitance Ca. The passive electrode 12 and the passive electrode 22 are also brought into close proximity to each other with a gap therebetween, forming a capacitor Cp.

Figure 5:
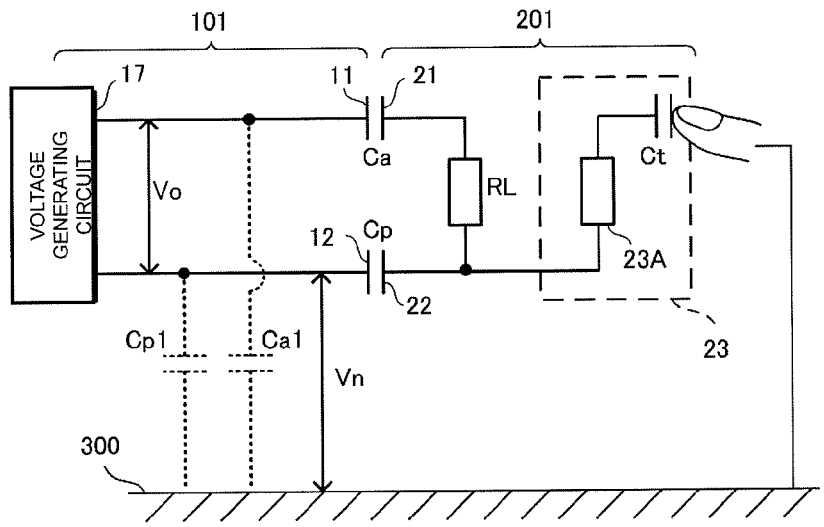
FIG. 5 is a simplified diagram of the equivalent circuit in FIG. 3.

FIG. 5 is a simplified diagram of the equivalent circuit in FIG. 3. The touch panel 23 is of a capacitive sensing type. When the touch panel 23 is touched, an electrostatic capacity (capacitor Ct) is formed between the human body and the touch panel 23, so that the touch panel 23 is connected to the earth via the human body. A weak current flows via the capacitor Ct, and by detecting the change in current by a detector 23A, an input position on the touch panel 23 is detected.

In a case where the high voltage portion of the active electrodes 11, 21 is not electrostatically shielded by the electrostatic shielding electrode 13, because the power transmitting device 101 and the power receiving device 201 are separated from an earth 300, as indicated by dotted lines in FIG. 5, a stray capacitance Ca1 is formed between the active electrode 11 and the earth 300, and a stray capacitance Cp1 is formed between the passive electrode 12 and the earth 300. The output voltage from the voltage generating circuit 17 is divided owing to the stray capacitance Ca1 and the stray capacitance Cp1. Specifically, when the output voltage from the voltage generating circuit 17 is Vo, and the voltage Vn of the stray capacitance Cp1 is Vn, the voltage Vn is represented by $Vo*Ca1/(Ca1+Cp1)$.

Assuming that the capacitance of Cp is sufficiently large for the sake of simplicity, because the touch panel 23 operates with the ground potential (that is, the voltage Vn) of the power receiving device 201 as a reference potential, when the reference potential (voltage Vn) fluctuates, the touch panel 23 does not operate properly. For this reason, it is necessary to reduce fluctuations of the reference potential (voltage Vn) of the touch panel 23 as much as possible. Accordingly, by making the stray capacitance Ca1 as small as possible (smaller than the stray capacitance Cp1), the voltage Vn can be reduced accordingly, and the ground potential (voltage Vn) of the power transmitting device 101 and the power receiving device 201 during power transmission can be stabilized.

Therefore, in this embodiment, as described above with reference to FIGS. 2 and 3, the high voltage portion such as the active electrode 11 is electrostatically shielded with respect to the earth 300 by the electrostatic shielding electrode 13. Consequently, the stray capacitance Ca1 illustrated in FIG. 5 can be made smaller than the stray capacitance Cp1, and the voltage Vn due to voltage division by the stray capacitances Ca1, Cp1 can be reduced. As a result, fluctuations of the ground potential with respect to the earth can be reduced. Consequently, malfunction of the touch panel 23 of the power receiving device 201 does not occur even when the touch panel 23 is touched during power transmission operation.

While the reference potential of the power transmitting device 101 is connected to the electrostatic shielding electrode 13 in this embodiment, the reference potential of the power receiving device 201 may be connected to the electrostatic shielding electrode 13.

Figure 6:
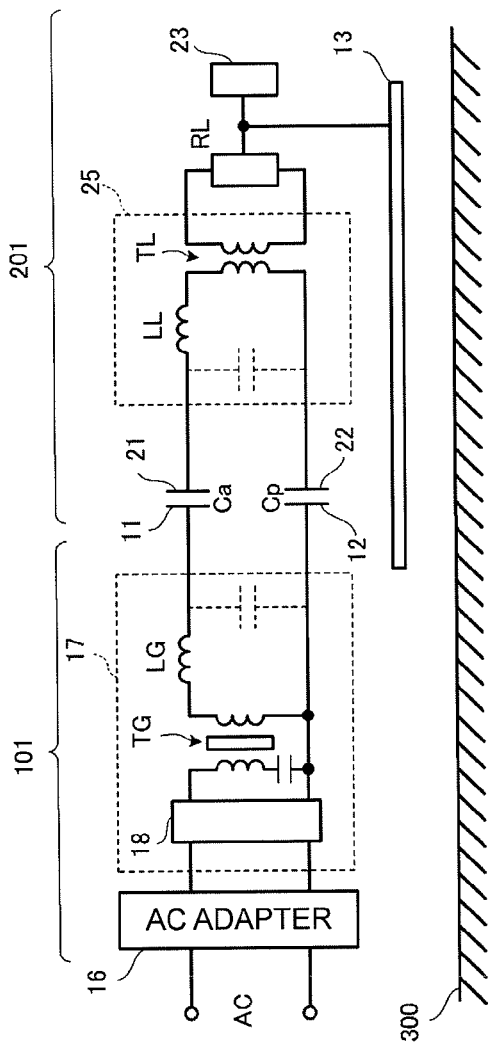
FIG. 6 is a schematic diagram of an equivalent circuit of a wireless power transmission system in a case where the reference potential of a power receiving device includes an electrostatic shielding electrode.

FIG. 6 is a schematic diagram of an equivalent circuit of the wireless power transmission system in a case where the reference potential of the power receiving device 201 includes the electrostatic shielding electrode 13. In this case, for example, the electrostatic shielding electrode 13 is provided to the power transmitting device 101 in advance, and when the power receiving device 201 is placed on the power transmitting device 101, the electrostatic shielding electrode 13 is connected to the reference potential of the power receiving device 201. The touch panel 23 operates with this reference potential as a reference. In this case as well, the stray capacitance Ca1 illustrated in FIG. 5 can be made smaller than the stray capacitance Cp1, and the divided voltage Vn due to the stray capacitances Ca1, Cp1 can be reduced, thereby reducing fluctuations of the ground potential with respect to the earth. As a result, it is possible to prevent malfunction of the power receiving device 201 when the touch panel 23 is touched during power transmission operation in the power receiving device 201.

While in this embodiment the passive electrodes 12, 22 of the power transmitting device 101 and power receiving device 201 are opposed to each other with a gap therebetween, the passive electrodes 12, 22 may be brought into direct electrical continuity with each other. For example, in FIG. 2, the passive electrodes 12, 22 may be partially exposed from the casings 10, 20 so as to bring the passive electrodes 12, 22 into direct electrical continuity with each other.

Figure 7:
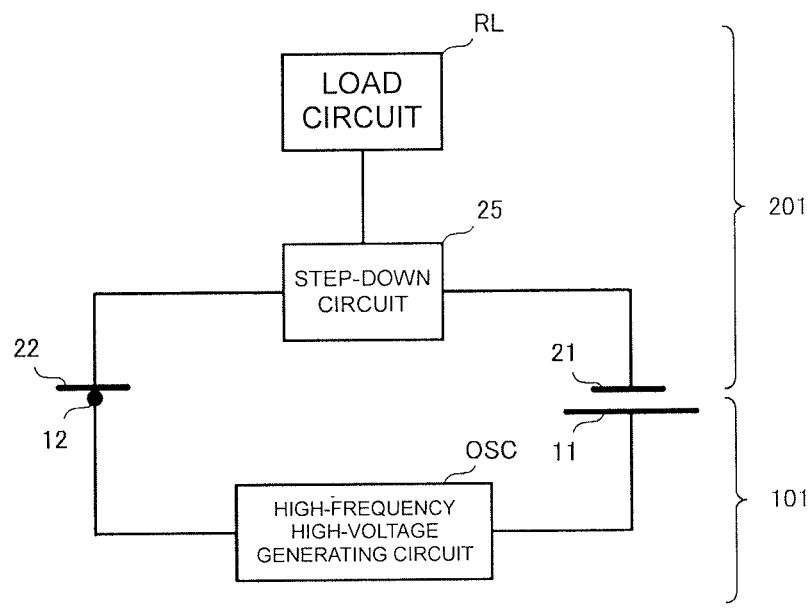
FIG. 7 is a schematic diagram illustrating a configuration in which a passive electrode of a power receiving device electrostatically shields active electrodes.

FIG. 7 is a simplified circuit diagram of a wireless power transmission system in which passive electrodes are brought into direct electrical continuity with each other. A high-frequency high-voltage generating circuit OSC is connected between the active electrode 11 and the passive electrode 12. The step-down circuit 25 is connected between the active electrode 21 and the passive electrode 22, and the load RL is connected to the step-down circuit 25. The passive electrodes 12, 22 may not be flat-shaped as illustrated in FIG. 2 but may be any electrodes that can be brought into direct electrical continuity with each other.

The high-frequency high-voltage generating circuit OSC generates a high-frequency high voltage between the active electrode 11 on the power transmitting device side and the passive electrode 12 on the power transmitting device side. The step-down circuit 25 decreases a voltage generated between the active electrode 21 on the power receiving device side and the passive electrode 22 on the power receiving device side. The output voltage of the step-down circuit 25 is inputted to the load circuit RL as a power supply voltage. The load circuit RL includes a rectifying and smoothing circuit that rectifies and smoothes the output of the step-down circuit 25, and a secondary battery that is charged by the output of this rectifying and smoothing circuit. The passive electrode 22 on the power receiving device side is in contact and electrical continuity with the passive electrode 12 on the power transmitting device side in the manner of direct current.

According to this configuration, because power is transmitted by using a high voltage that has been increased, the current that flows to the passive electrode 12 on the power transmitting device side may be on the order of several mA, for example. In the case of conventional contact-type charging devices that charge the secondary battery by means of contact of a contact electrode, a charging current on the order of several A directly flows as it is, resulting in large loss due to contact resistance. In contrast, according to the present invention, the influence of the contact resistance of the passive electrode on the power transmitting device side is very small, and thus there is no need to make the contact resistance low. Therefore, various contact means such as conductive rubber can be employed.

Figure 8:
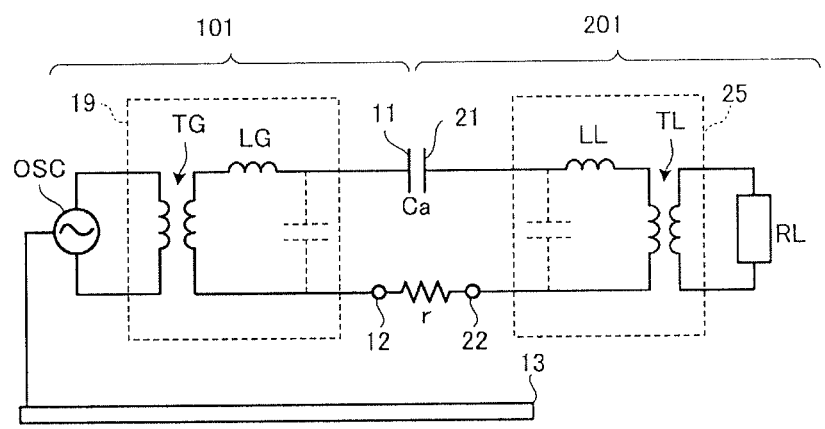
FIG. 8 is an equivalent circuit diagram of the wireless power transmission system illustrated in FIG. 7.

FIG. 8 is an equivalent circuit diagram of the wireless power transmission system illustrated in FIG. 7. The high-frequency high-voltage generating circuit OSC of the power transmitting device 101 generates a high-frequency voltage of 100 kHz to several tens MHz, for example. A step-up circuit 19 including a step-up transformer TG and an inductor LG increases the voltage generated by the high-frequency high-voltage generating circuit OSC, and applies the increased voltage between the active electrode 11 and the passive electrode 12. The step-down circuit 25 including a step-down transformer TL and an inductor LL is connected between the active electrode 21 on the power receiving device side and the passive electrode 22 on the power receiving device side. The load circuit RL is connected to the secondary side of the step-down transformer TL. The load circuit RL includes a rectifying and smoothing circuit and a secondary battery.

A resistance r connected between the passive electrode 12 on the power transmitting device side and the passive electrode 22 on the power receiving device side corresponds to the contact resistance formed at the contact between the passive electrode 12 on the power transmitting device side and the passive electrode 22 on the power receiving device side. A capacitance Ca is generated between the active electrode 11 on the power transmitting device side and the active electrode 21 on the power receiving device side.

The contact resistance r and the capacitance Ca of the capacitive coupling portion have the following relationship: $r \ll 1/\omega Ca$. Because the passive electrodes of the power transmitting device 101 and power receiving device 201 are in direct electrical continuity with each other in this way, the potential of the passive electrode 12 on the power receiving device side becomes substantially equal to the potential of the passive electrode 22 on the power transmitting device side. As a result, the potential of the passive electrode 22 on the power receiving device side becomes stable, and fluctuations of the ground potential and leakage of unnecessary electromagnetic field are reduced. Moreover, because stray capacitance is reduced, the degree of coupling improves, and high transmission efficiency can be obtained.

Embodiment 2

Next, a wireless power transmission system according to Embodiment 2 will be described. This embodiment differs from Embodiment 1 in how active electrodes and passive electrodes are positioned in the power transmitting device 101 and the power receiving device 201. The circuit configurations of the power transmitting device 101 and power receiving device 201 are the same as those in Embodiment 1, and a description thereof is omitted.

Figure 9:
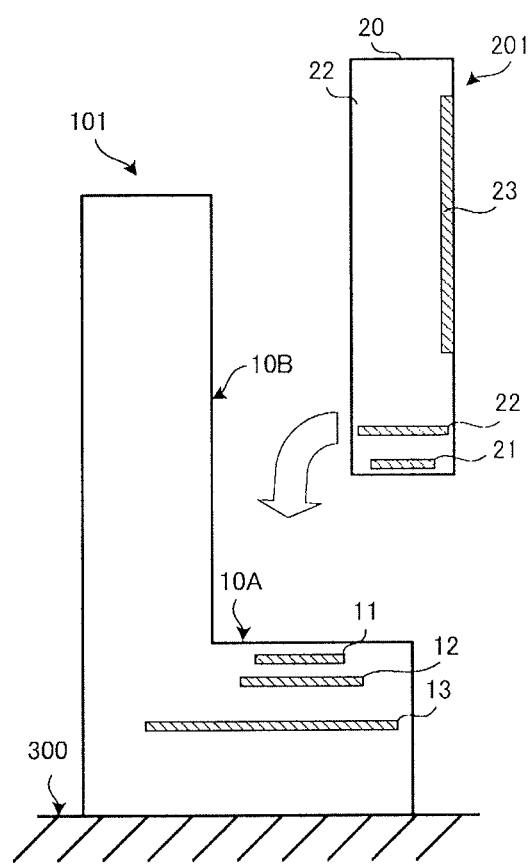
FIG. 9 is a side view of a power transmitting device and a power receiving device of a wireless power transmission system according to Embodiment 2.

FIG. 9 is a side view of the power transmitting device and the power receiving device of a wireless power transmission system according to Embodiment 2. Components and the like included in the power transmitting device 101 and the power receiving device 201 according to this embodiment are the same as those in Embodiment 1.

The active electrode 11 of the power transmitting device 101 is provided along the placing surface 10A. The passive electrode 12 is provided in parallel to the placing surface 10A so that the active electrode 11 is interposed between the passive electrode 12 and the placing surface 10A. Further, the electrostatic shielding electrode 13 is provided so as to be interposed between the active electrode 11 and the passive electrode 12, and the earth 300.

The active electrode 21 of the power receiving device 201 is provided along the bottom surface. The passive electrode 22 is provided in parallel to the bottom surface so that the active electrode 21 is interposed between the passive electrode 22 and the bottom surface.

In the case of this configuration as well, as in Embodiment 1, during power transmission, the active electrodes 11, 21, and the passive electrodes 12, 22 are opposed and electric-field coupled to each other with a gap therebetween. Consequently, power is transmitted from the power transmitting device 101 to the power receiving device 201. Since the electrostatic shielding electrode 13 is interposed between the active electrodes 11, 21 that become a high voltage portion and the earth 300, the high voltage portion can be electrostatically shielded with respect to the earth (the earth ground, a floor, a desk, or the like). As a result, even when the touch panel 23 is operated during power transmission operation, whether the touch panel 23 has been operated or not can be detected with reliability, thereby reducing malfunction of the touch panel 23.

Embodiment 3

Next, a wireless power transmission system according to Embodiment 3 will be described. This embodiment differs from Embodiment 1 in how active electrodes and passive electrodes are positioned in the power transmitting device 101 and the power receiving device 201.

Figure 10:
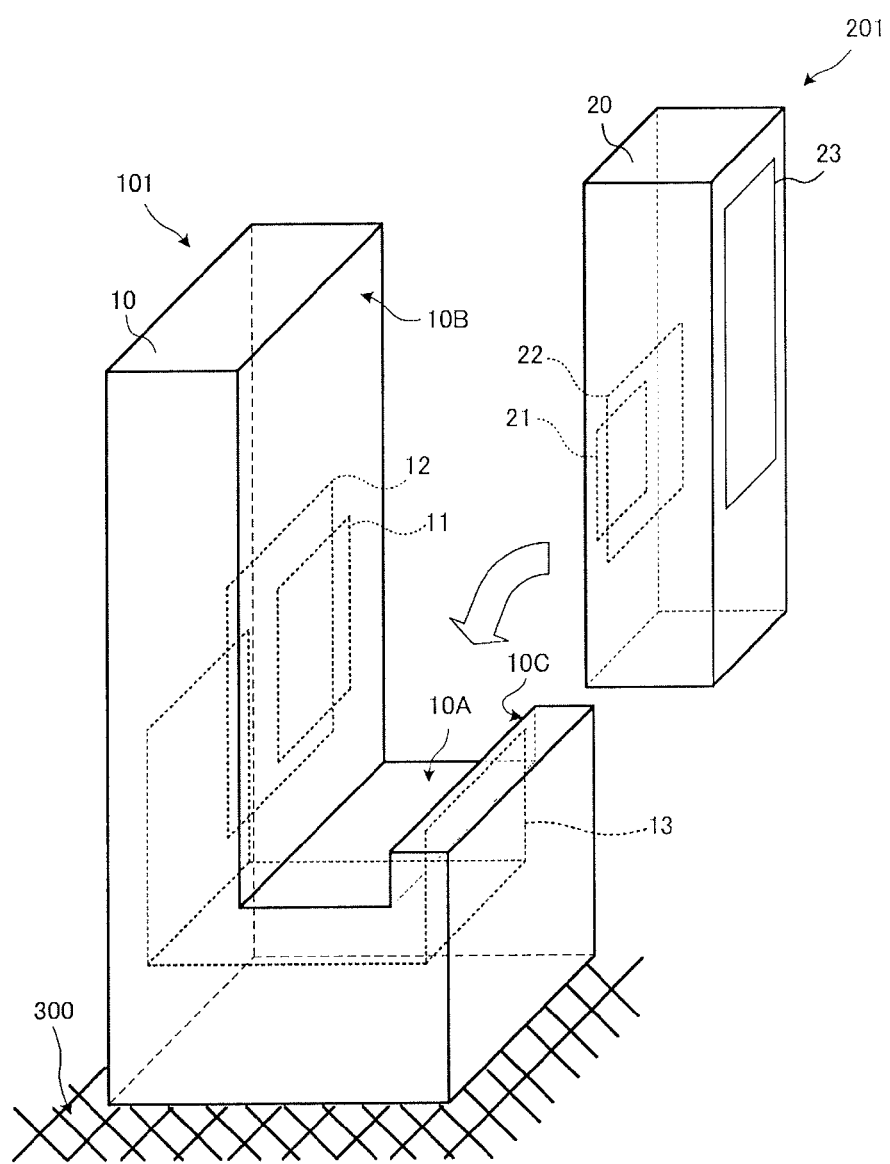
FIG. 10 illustrates a wireless power transmission system according to Embodiment 3.

FIG. 10 illustrates a wireless power transmission system according to Embodiment 3. Components and the like included in the power transmitting device 101 and the power receiving device 201 according to this embodiment are the same as those in Embodiment 1. The casing 10 of the power transmitting device 101 differs from that in Embodiment 1, 2.

The casing 10 of the power transmitting device 101 has a front surface 10C. The front surface 10C is substantially perpendicular to the placing surface 10A, and is opposed to the backrest surface 10B in parallel thereto. The placing surface 10A, the backrest surface 10B, and the front surface 100 each have an oblong rectangular shape. The long side of the placing surface 10A and the short side of the backrest surface 10B coincide with each other, and the long side of the placing surface 10A and the long side of the front surface 100 coincide with each other. The front surface 100 has such a size that when the power receiving device 201 is placed, the front surface 100 does not overlap the touch panel 23 provided in the front surface of the casing 20.

The active electrode 11 of the power transmitting device 101 is provided along the backrest surface 10B. The passive electrode 12 is provided in parallel to the backrest surface 10B so that the active electrode 11 is interposed between the passive electrode 12 and the backrest surface 10B. Further, the electrostatic shielding electrode 13 is provided along each of the placing surface 10A, the backrest surface 10B, and the front surface 100 so as to surround the opposed active electrodes 11, 21 and the opposed passive electrodes 12, 22 when the power receiving device 201 is placed on the placing surface 10A. While the power transmitting device 101 includes the electrostatic shielding electrode 13 having an integral surface extending along each of the placing surface 10A, the backrest surface 10B, and the front surface 10C, the power transmitting device 101 may include an electrostatic shielding electrode formed independently for each of these surfaces.

The active electrode 21 of the power receiving device 201 is provided along the back surface. The passive electrode 22 is provided in parallel to the back surface so that the active electrode 21 is interposed between the passive electrode 22 and the back surface.

In the case of this configuration as well, as in Embodiments 1, 2, during power transmission, the active electrodes 11, 21, and the passive electrodes 12, 22 are opposed and electric-field coupled to each other with a gap therebetween. Consequently, power is transmitted from the power transmitting device 101 to the power receiving device 201. Since the electrostatic shielding electrode 13 is interposed between the active electrodes 11, 21 that become a high voltage portion and the earth 300, the high voltage portion can be electrostatically shielded with respect to the earth (the earth ground, a floor, a desk, or the like). As a result, even when the touch panel 23 is operated during power transmission operation, whether the touch panel 23 has been operated or not can be detected with reliability, thereby reducing malfunction of the power receiving device 201.

Embodiment 4

Hereinafter, Embodiment 4 of the present invention will be described. While in Embodiments 1 to 3 the electrostatic shielding electrode for providing electrostatic shielding with respect to the earth is provided as an independent component, in Embodiment 4, passive electrodes are used as electrostatic shielding electrodes.

Figure 11:
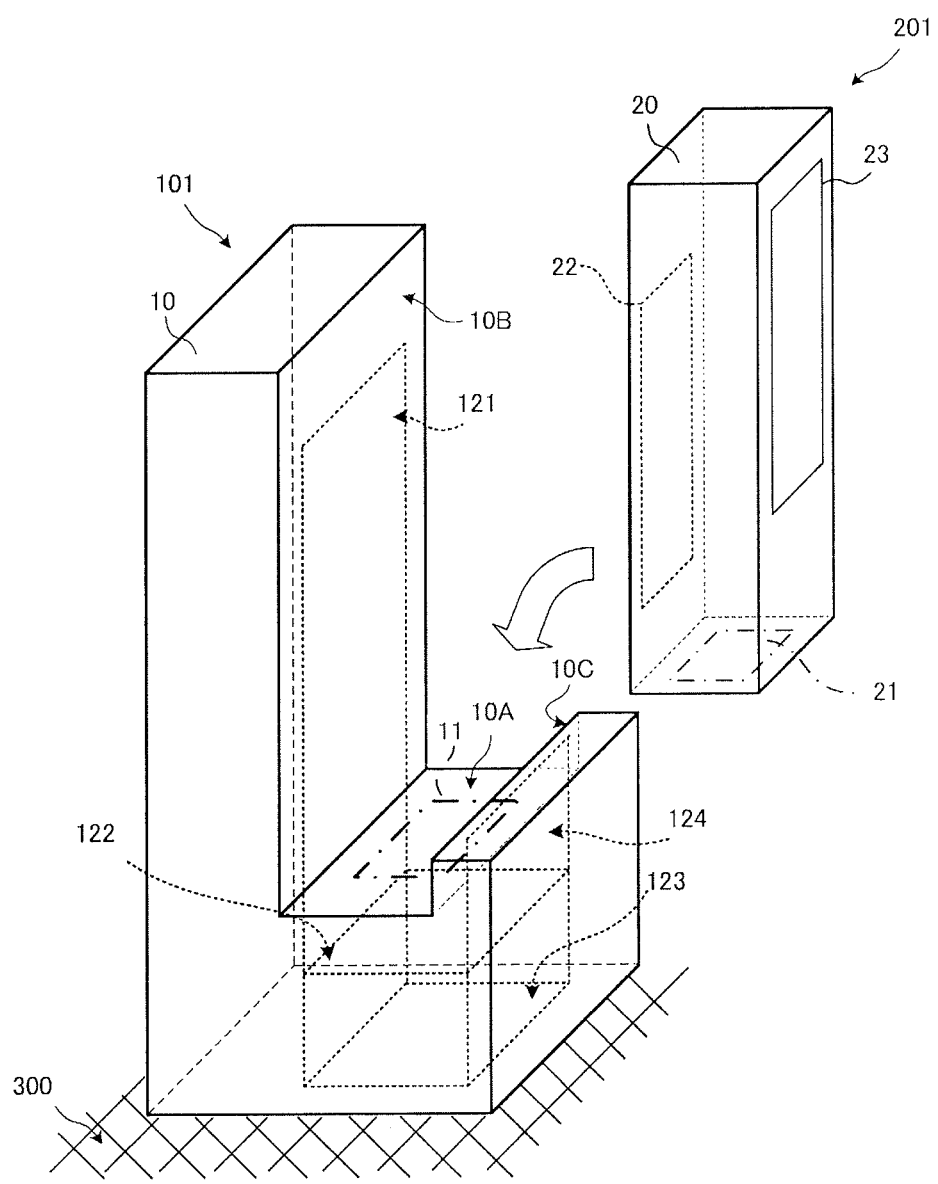
FIG. 11 is a perspective view of a power transmitting device and a power receiving device.
Figure 12:
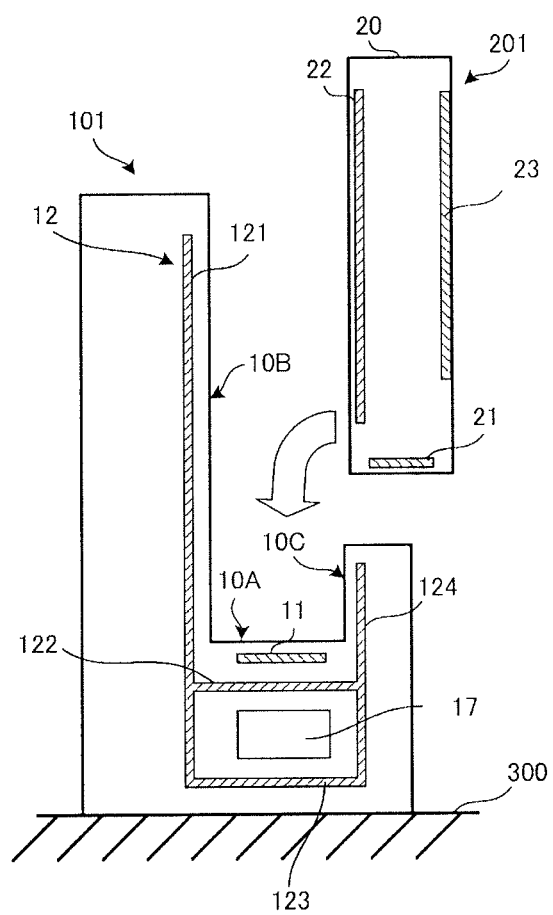
FIG. 12 is a side view of a power transmitting device and a power receiving device.

FIG. 11 is a perspective view of the power transmitting device and the power receiving device. FIG. 12 is a side view of the power transmitting device and the power receiving device. The casing 10 of the power transmitting device 101 according to this embodiment has the same shape as that in Embodiment 3.

The casing 20 of the power receiving device 201 has the passive electrode 22 provided along the back surface. The passive electrode 22 has an oblong rectangular shape, and is provided in such a way that its longitudinal direction coincides with the height direction of the power receiving device 201. When the power receiving device 201 is placed on the power transmitting device 101, the passive electrode 22 is opposed to a passive electrode 121 described later, which is provided in the power transmitting device 101, with a gap therebetween. The passive electrode 22 may be partially or entirely exposed so as to be brought into direct electrical continuity with the passive electrode 121 on the power transmitting device 101 side.

The casing 20 of the power receiving device 201 has the active electrode 21 provided along the bottom surface. The bottom surface of the casing 20 has an oblong rectangular shape whose long side coincides with the short side of each of the front surface and the back surface. The active electrode 21 has an oblong rectangular shape, and is provided in such a way that its longitudinal direction coincides with the longitudinal direction of the bottom surface of the casing 20 (hereinafter, referred to as width direction of the power receiving device 201). When the power receiving device 201 is placed on the power transmitting device 101, the active electrode 21 is opposed to the active electrode 11 described later, which is provided in the power transmitting device 101, with a gap therebetween.

As in Embodiment 3, the casing 10 of the power transmitting device 101 has the placing surface 10A, the backrest surface 10B, and the front surface 10C. The placing surface 10A, the backrest surface 10B, and the front surface 100 each have an oblong rectangular shape. The long side of the placing surface 10A and the short side of the backrest surface 10B coincide with each other, and the long side of the placing surface 10A and the long side of the front surface 100 coincide with each other.

The power receiving device 201 is placed on the power transmitting device 101 so that the bottom surface of the power receiving device 201 is located on the placing surface 10A side, and the back surface of the power receiving device 201 is located on the backrest surface 10B side. The front surface 100 has such a size that when the power receiving device 201 is placed, the front surface 100 does not overlap the touch panel 23 provided in the front surface of the casing 20.

The power transmitting device 101 includes the active electrode 11 provided along the placing surface 10A. The active electrode 11 has an oblong rectangular shape, and is provided in such a way that its longitudinal direction coincides with the longitudinal direction of the placing surface 10A (hereinafter, referred to as width direction of the power transmitting device 101). When the power receiving device 201 is placed on the power transmitting device 101, the active electrode 11 on the power transmitting device 101 side and the active electrode 21 on the power receiving device 201 side are opposed to each other with a gap therebetween.

The casing 10 has the passive electrode 121 provided along the backrest surface 10B. The passive electrode 121 has an oblong rectangular shape, and is provided in such a way that its longitudinal direction coincides with the height direction of the power transmitting device 101. When the power receiving device 201 is placed on the power transmitting device 101, the passive electrode 121 on the power transmitting device 101 side and the passive electrode 22 on the power receiving device 201 side are opposed to (or brought into direct electrical continuity with) each other.

The casing 10 is further provided with passive electrodes 122, 123. The passive electrodes 122, 123 are provided perpendicularly to the passive electrode 121, and are opposed to the placing surface 10A in parallel thereto. The passive electrodes 122, 123 have an oblong rectangular shape, and are provided in such a way that their longitudinal direction coincides with the width direction of the power transmitting device 101. The passive electrode 122 is located between the active electrode 11 and the passive electrode 123 with respect to the height direction of the power transmitting device 101.

Further, the power transmitting device 101 includes a passive electrode 124 provided along the front surface 10C. The passive electrode 124 is orthogonal to the passive electrodes 122, 123, and provided in parallel to the passive electrode 121. The passive electrodes 121, 122, and 124 surround three sides of the active electrode 11 of the power transmitting device 101.

Therefore, the active electrode 11 on the power transmitting device 101 side and the active electrode 21 on the power receiving device 201 side, which are opposed to each other when the power receiving device 201 is placed on the power transmitting device 101, are surrounded on their three sides by the passive electrodes 121, 122, and 124.

The power transmitting device 101 also includes the voltage generating circuit 17. The voltage generating circuit 17 converts a direct-current voltage supplied via the AC adapter into an alternating-current voltage, increases the alternating-current voltage, and supplies the resulting voltage between the active electrode 11 and the passive electrode 121. The voltage generating circuit 17 is located between the passive electrode 122 and the passive electrode 123. Therefore, four sides of the power generating circuit 17 are surrounded by the passive electrodes 121, 122, 123, 124.

In this embodiment, the power transmitting device 101 is configured so that high voltage portions such as the active electrodes 11, 21 that are electric-field coupled to each other, and the voltage generating circuit 17 are surrounded by the passive electrodes 121, 122, 123, 124, thereby electrostatically shielding the high voltage portions with respect to the earth (the earth ground, a floor, a desk, or the like).

Consequently, the ground potential in the power transmitting device 101 and the power receiving device 201 does not fluctuate greatly. As a result, even when the touch panel 23 is operated during power transmission operation, whether the touch panel 23 has been operated or not can be detected with reliability, thereby reducing malfunction of the touch panel 23.

Since the circuit configuration of the wireless power transmission system according to Embodiment 4 is the same as in Embodiments 1 to 3 except that the electrostatic shielding electrode 13 is not provided, a description thereof is omitted.

As described above, in the wireless power transmission system according to this embodiment, the active electrodes 11, 21 that are opposed to each other when the power receiving device 201 is placed on the power transmitting device 101 are electrostatically shielded with respect to the earth by the passive electrodes 121, 122, 123, 124. Consequently, the ground potential of each of the power transmitting device 101 and the power receiving device 201 can be stabilized. As a result, even when the touch panel 23 is touched during power transmission from the power transmitting device 101 to the power receiving device 201, that is, during power transmission operation in the power receiving device 201, malfunction of the power receiving device 201 can be prevented.

In a case where active electrodes and the like are electrostatically shielded by passive electrodes, as illustrated in FIGS. 11, 12, and the like, it is preferable to provide the passive electrodes 122, 123 on the lower side (on the earth side) of the active electrode 11. However, the configuration for electrostatically shielding a high voltage portion is not limited to that in the above-mentioned embodiment. The high voltage portion may not necessarily be entirely covered but may be electrostatically shielded only partially.

While the passive electrode 22 on the power receiving device 201 side is provided only along the back surface of the casing 20, a passive electrode may be further provided along the side surface of the casing 20. Further, while the active electrodes of the power transmitting device 101 and power receiving device 201 are respectively provided along the placing surface 10A of the power transmitting device 101 and the bottom surface of the casing 20, this should not be construed restrictively.

Figure 13:
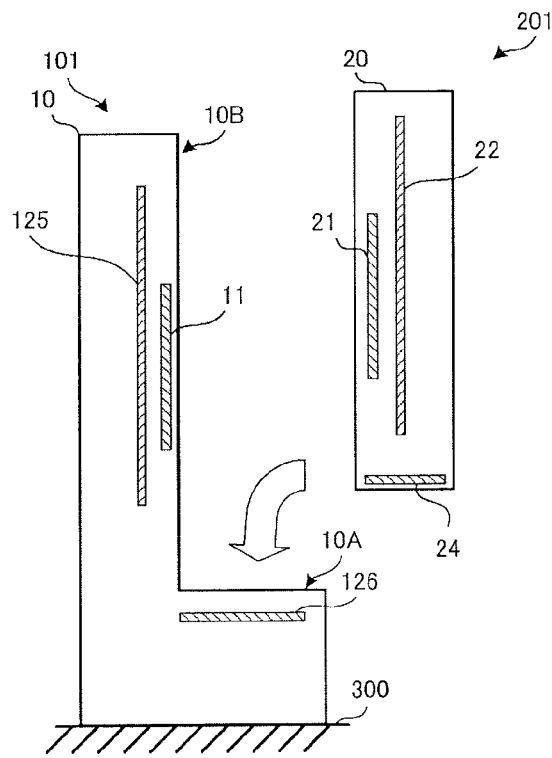
FIG. 13 is a schematic diagram illustrating another example of configuration in which passive electrodes of a power transmitting device electrostatically shield active electrodes.
Figure 14:
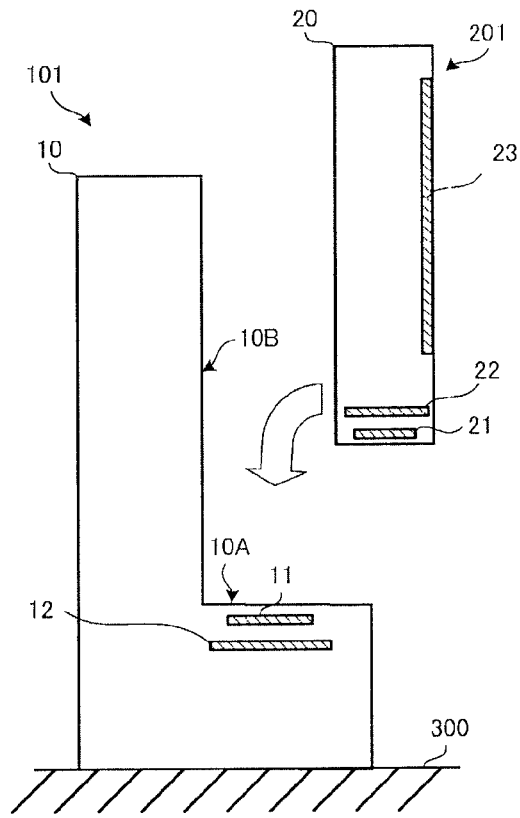
FIG. 14 is a schematic diagram illustrating another example of configuration in which a passive electrode of a power transmitting device electrostatically shields active electrodes.
Figure 15:
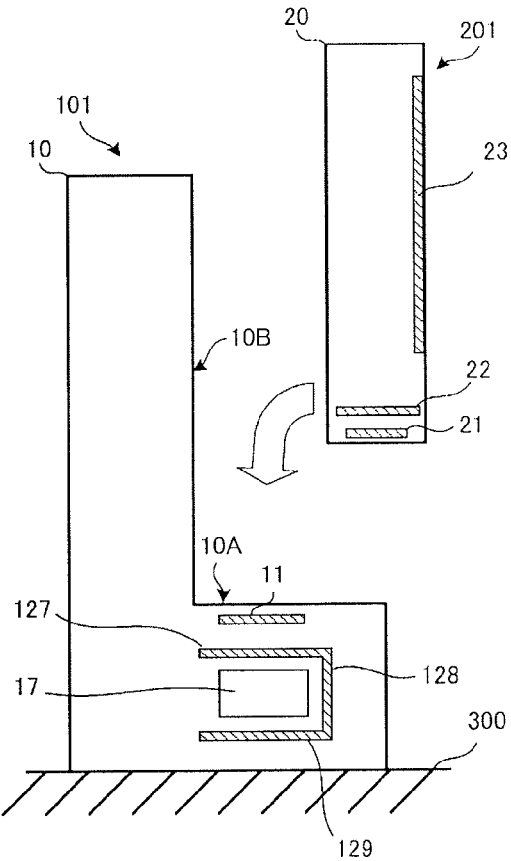
FIG. 15 is a schematic diagram illustrating another example of configuration in which passive electrodes of a power transmitting device electrostatically shield active electrodes.

FIGS. 13, 14, and 15 are schematic diagrams each illustrating another example of configuration in which passive electrodes of the power transmitting device 101 electrostatically shield active electrodes. For example, as illustrated in FIG. 13, the active electrode 11 is provided along the backrest surface 10B of the power transmitting device 101, and the active electrode 21 is provided along the back surface of the casing 20 of the power receiving device 201. Further, passive electrodes 125, 22 of the power transmitting device 101 and power receiving device 201 are provided so as to be opposed to each other across the active electrodes 11, 21. Further, a passive electrode 24 is provided along the bottom surface of the casing 20, and a passive electrode 126 opposed to the passive electrode 24 is provided along the placing surface 10A of the power transmitting device 101. According to this configuration, the opposed active electrodes 11, 21 are electrostatically shielded with respect to the earth by the passive electrodes 125, 126, 22, 24.

As illustrated in FIG. 14, the active electrode 11 and the passive electrode 12 may be provided along the placing surface 10A of the power transmitting device 101, and the active electrode 21 and the passive electrode 22 may be provided along the bottom surface of the power receiving device 201. In this case, the opposed active electrodes 11, 21 are interposed between the opposed passive electrodes 12, 22. Consequently, the passive electrode 12 functions as an electrostatic shielding section with respect to the earth.

Further, as illustrated in FIG. 15, the voltage generating circuit 17 of the power transmitting device 101 which becomes a high voltage portion may be surrounded by passive electrodes 127, 128, 129. In this case, the active electrode 11 and passive electrode 127 of the power transmitting device 101 are provided along the placing surface 10A of the casing 10. The passive electrode 129 is provided so that the voltage generating circuit 17 is interposed between the passive electrode 127 and the passive electrode 129, and electrical continuity between the passive electrodes 127, 129 is established by the passive electrode 128. The active electrode 21 and passive electrode 22 of the power receiving device 201 are provided along the bottom surface of the casing 20. In the case of FIG. 15, the voltage generating circuit 17 can be also electrostatically shielded with respect to the earth 300 by the passive electrodes 127, 128, 129 that function as electrostatic shielding electrodes.

Figure 16:
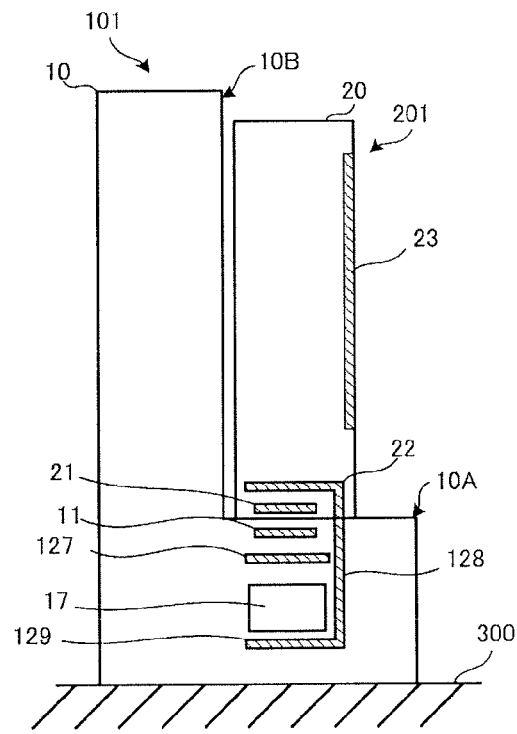
FIG. 16 illustrates a modification of the wireless power transmission system illustrated in FIG. 15, and is a side cross-sectional view of a power transmitting device and a power receiving device.

FIG. 16 illustrates a modification of the wireless power transmission system illustrated in FIG. 15, and is a side cross-sectional view of the power transmitting device 101 and the power receiving device 201. The passive electrode 128 is formed so as to be partially exposed from the placing surface 10A of the casing 10. Moreover, the passive electrode 22 of the power receiving device 201 is formed so as to be partially exposed from the bottom surface of the casing 20. The exposed portions of the passive electrode 22 and passive electrode 129 are brought into electrical continuity with each other when the power receiving device 201 is placed on the power transmitting device 101. In this case, the passive electrode 129 that functions as an electrostatic shielding electrode with respect to the voltage generating circuit 17 is at the same potential as the passive electrode 22 of the power receiving device 201. According to this configuration as well, the high voltage portion can be electrostatically shielded with respect to the earth 300, thereby preventing malfunction of the touch panel 23.

Embodiment 5

Hereinafter, Embodiment 5 of the present invention will be described. Each of the power transmitting device and the power receiving device according to Embodiment 5 includes a pair of active electrodes.

Figure 17:
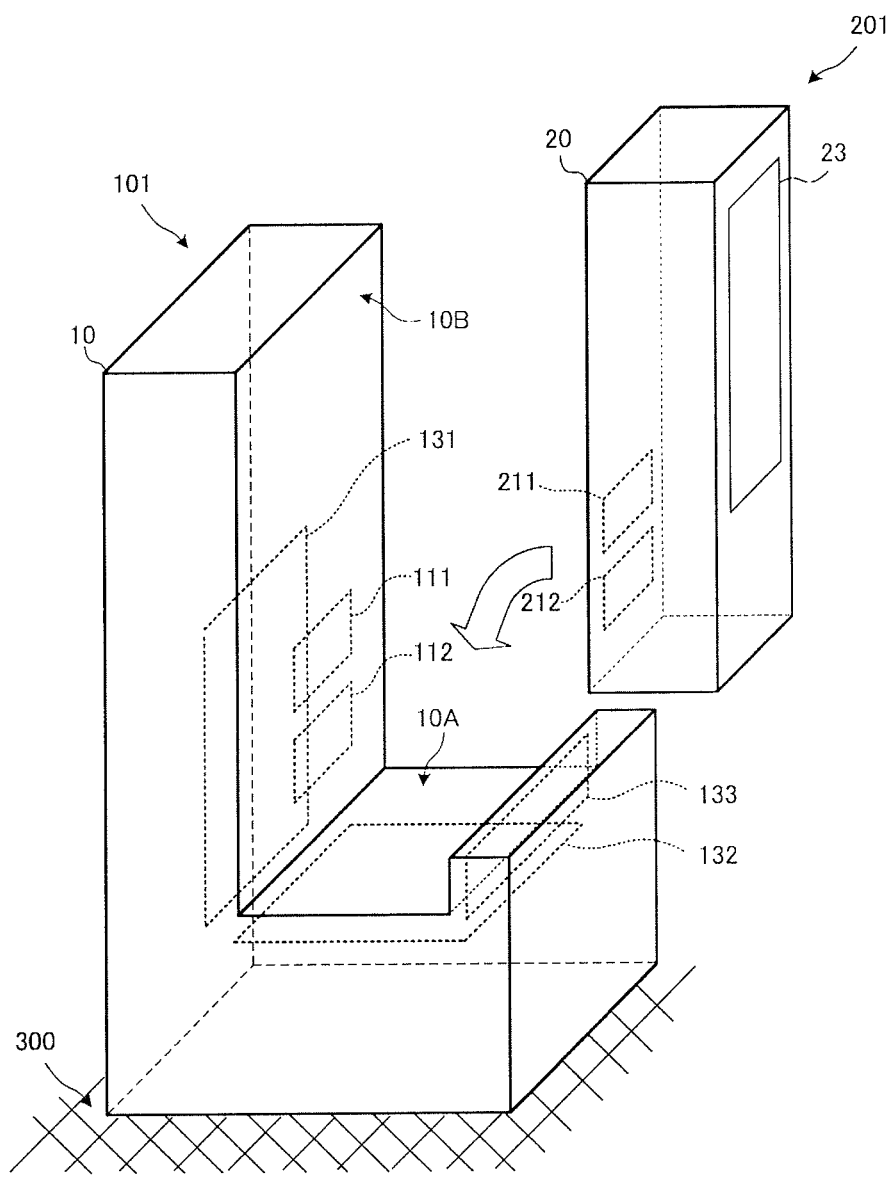
FIG. 17 is a perspective view of a power transmitting device and a power receiving device.
Figure 18:
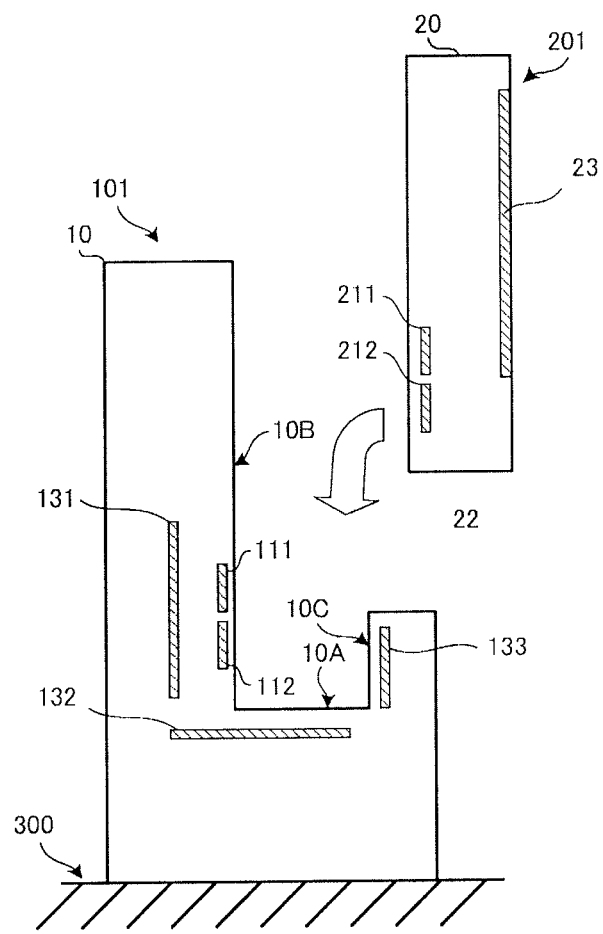
FIG. 18 is a side view of a power transmitting device and a power receiving device.

FIG. 17 is a perspective view of the power transmitting device and the power receiving device. FIG. 18 is a side view of the power transmitting device and the power receiving device. The casing 10 of the power transmitting device 101 according to this embodiment has the same shape as that in Embodiment 3, 4.

The casing 10 of the power transmitting device 101 has active electrodes 111, 112 provided along the backrest surface 10B. The active electrodes 111, 112 have a rectangular shape, and are arranged in the height direction of the power transmitting device 101. An electrostatic shielding electrode 131 is provided in parallel to the backrest surface 10B. An electrostatic shielding electrode 132 is provided along the placing surface 10A of the casing 10. The electrostatic shielding electrode 132 is positioned between a high voltage portion such as an unillustrated voltage generating circuit, and the earth 300. An electrostatic shielding electrode 133 is provided along the front surface 10C of the casing 10.

The casing 20 of the power receiving device 201 has active electrodes 211, 212 provided along the back surface. The active electrodes 211, 212 have a rectangular shape, and are arranged in the height direction of the power receiving device 201.

Figure 19:
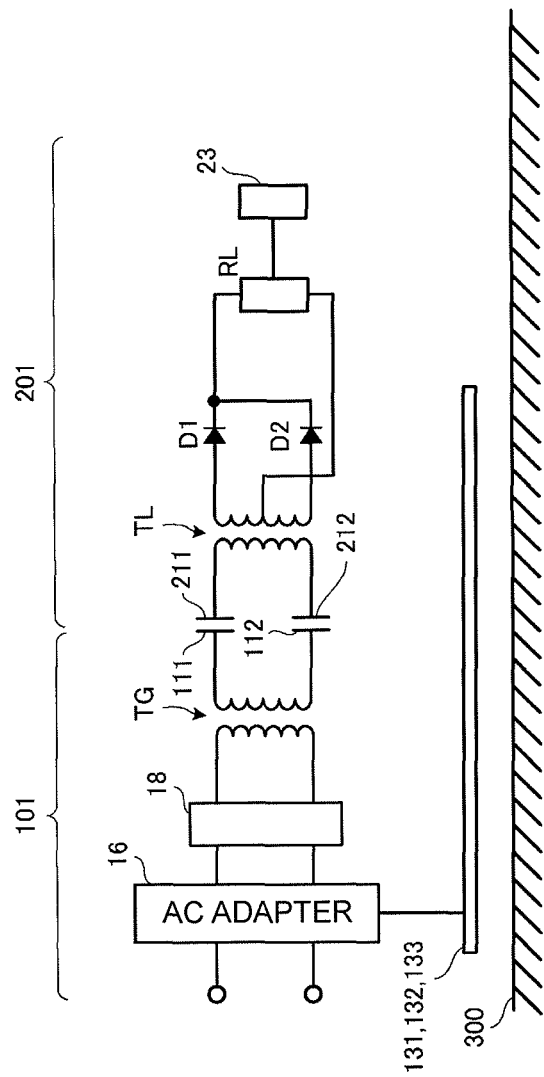
FIG. 19 is an equivalent circuit diagram of a wireless power transmission system according to Embodiment 4.

FIG. 19 is an equivalent circuit diagram of the wireless power transmission system according to this embodiment.

In the power transmitting device 101, one end of the secondary winding of a transformer TG is connected to the active electrode 111, and the other end is connected to the active electrode 112.

In the power receiving device 201, one end of the primary winding of a step-down transformer TL is connected to the active electrode 211, and the other end is connected to the active electrode 212. The secondary winding of the step-down transformer TL is connected to a load circuit RL, via diodes D1, D2 provided at their opposite ends. Moreover, the secondary winding has a center tap, and the center tap is connected to the load circuit RL.

Because the electrostatic shielding electrodes 131, 132, 133 are provided between the opposed active electrodes 111 and 211 and the earth 300, and between the opposed active electrodes 112 and 212 and the earth 300 in this way, each electrode is electrostatically shielded with respect to the earth 300. Consequently, the potential of each electrode does not fluctuate greatly with respect to the earth 300, thereby preventing malfunction of the touch panel 23 as in the embodiments described above.

While in this embodiment the active electrodes 111, 112 are provided along the backrest surface 10B of the casing 10, the active electrodes 111, 112 may be provided along the placing surface 10A. In this case, the active electrodes 211, 212 are provided along the bottom surface of the casing 20. While a rectifying circuit is formed by two diodes D1, D2 on the secondary side of the step-down transformer TL of the power receiving device 201, the rectifying circuit may be a diode bridge circuit, or may be configured in other ways.

The specific configurations and the like of the power transmitting device 101 and power receiving device 201 described above can be changed in design as appropriate, and the operation and effect described in the embodiments mentioned above are merely illustrative of the most preferred operation and effect derived from the present invention. The operation and effect according to the present invention are not limited to those described in the embodiments mentioned above.

REFERENCE SIGNS LIST 10 casing
10A placing surface
10B backrest surface
10C front surface
11 active electrode 12 passive electrode
13 electrostatic shielding electrode
17 voltage generating circuit
20 casing
21 active electrode
22 passive electrode
23 touch panel
101 power transmitting device
201 power receiving device
300 earth
RL load circuit

The invention claimed is:

1. A wireless power transmission system comprising:
a power transmitting device including:
a transmitting-side electrode, and
a voltage generating circuit configured to apply a voltage to the transmitting-side electrode; and
a power receiving device including:
a receiving-side electrode capacitively coupled to the transmitting-side electrode,
a step-down circuit configured to decrease a voltage generated in the receiving-side electrode, and
a load circuit configured to receive the decreased voltage from the step-down circuit,
wherein at least one of the power transmitting device and the power receiving device further comprises an electrostatic shielding element configured to reduce stray capacitance formed between Earth and at least one of the transmitting-side electrode and the receiving-side electrode, respectively,
wherein the transmitting-side electrode comprises a transmitting-side active electrode and a transmitting-side passive electrode having a lower potential than the transmitting-side active electrode, and
wherein the receiving-side electrode comprises a receiving-side active electrode and a receiving-side passive electrode having a lower potential than the receiving-side active electrode.

2. The wireless power transmission system according to claim 1, wherein:
the transmitting-side active electrode is capacitively coupled to the receiving-side active electrode, and
the transmitting-side passive electrode is disposed adjacent to the receiving-side passive electrode.

3. The wireless power transmission system according to claim 2, wherein:
the transmitting-side active electrode and the receiving-side active electrode are separated by a first gap, and
the transmitting-side passive electrode and the receiving-side passive electrode are separated by a second gap.

4. A wireless power transmission system comprising:
a power transmitting device including:
a transmitting-side electrode, and
a voltage generating circuit configured to apply a voltage to the transmitting-side electrode; and
a power receiving device including:
a receiving-side electrode capacitively coupled to the transmitting-side electrode,
a step-down circuit configured to decrease a voltage generated in the receiving-side electrode, and
a load circuit configured to receive the decreased voltage from the step-down circuit,
wherein at least one of the power transmitting device and the power receiving device further comprises an electrostatic shielding element configured to reduce stray capacitance formed between Earth and at least one of the transmitting-side electrode and the receiving-side electrode, respectively,
wherein the transmitting-side electrode comprises a first transmitting-side electrode and a second transmitting-side electrode,
wherein the receiving-side electrode comprises a first receiving-side electrode opposed to the first transmitting-side electrode, and a second receiving-side electrode opposed to the second transmitting-side electrode,
wherein the voltage generating circuit is configured to apply a first voltage to the first transmitting-side electrode and a second voltage to the second transmitting-side electrode, and
wherein the first voltage and the second voltage are opposite in phase.

5. The wireless power transmission system according to claim 1, wherein the electrostatic shielding element is further configured to electrostatically shield the voltage generating circuit.

6. The wireless power transmission system according claim 1, wherein the electrostatic shielding element is further configured to electrostatically shield the step-down circuit.

7. The wireless power transmission system according to claim 1, wherein the power receiving device further comprises a capacitive input with a reference potential set to a potential of the receiving-side passive electrode.

8. The wireless power transmission system according to claim 1, wherein the electrostatic shielding element is at least one of the transmitting-side passive electrode or the receiving-side passive electrode.

9. The wireless power transmission system according to claim 1, wherein:
the power receiving device further comprises a front surface having a capacitive input, a back surface parallel to the front surface, and a bottom surface disposed between respective ends of the front surface and the back surface,
the receiving-side active electrode is disposed along the bottom surface, and
the receiving-side passive electrode is disposed along the back surface.

10. The wireless power transmission system according to claim 9, wherein:
the power transmitting device further comprises a placing surface configured to contact the bottom surface of the power receiving device, a backrest surface extending perpendicularly from a first end of the placing surface and configured to contact the back surface of the power receiving device, and a front surface extending perpendicularly from a second end of the placing surface,
the transmitting-side active electrode is disposed along the placing surface, and
the transmitting-side passive electrode is disposed along at least one of the backrest surface and the front surface.

11. The wireless power transmission system according to claim 10, wherein transmitting-side passive electrode is disposed on a side opposite to the placing surface across the transmitting-side active electrode.

12. The wireless power transmission system according to claim 1, wherein:
the power receiving device further comprises a front surface having a capacitive input section, a back surface parallel to the front surface, and a bottom surface disposed between respective ends of the front surface and the back surface, the receiving-side active electrode is disposed along the back surface, the receiving-side passive electrode comprises a bottom-surface-side passive electrode disposed along the bottom surface and a back-surface-side passive electrode opposed to the back surface, the power transmitting device comprises a placing surface configured to contact the bottom surface of the power receiving device, and a backrest surface extending perpendicularly from an end of the placing surface and configured to contact the back surface of the power receiving device, the transmitting-side active electrode is disposed along the backrest surface, and the transmitting-side passive electrode has a placing-surface-side passive electrode disposed along the placing surface, and a backrest-surface-side passive electrode opposed to the backrest surface.

13. The wireless power transmission system according to claim 4, wherein:

the power receiving device comprises a front surface having a capacitive input section, a back surface parallel to the front surface, and a bottom surface that extends between respective ends of the front surface and the back surface, the first receiving-side electrode and the second receiving-side electrode are disposed along the bottom surface or the back surface, the power transmitting device comprises a placing surface configured to contact the bottom surface of the power receiving device, and a backrest surface extending perpendicularly form an end of the placing surface and configured to contact the back surface of the power receiving device, and the first transmitting-side electrode and the second transmitting-side electrode are disposed along the placing surface or the backrest surface.

14. A power transmitting device configured to receive a power receiving device having a receiving-side active electrode and a receiving-side passive electrode, the power transmitting device comprising:

a transmitting-side active electrode positioned adjacent to the receiving-side active electrode when the power receiving device is placed on the power transmitting device;

a transmitting-side passive electrode positioned adjacent to the receiving-side passive electrode when the power receiving device is placed on the power transmitting device;

a voltage generating circuit configured to apply a voltage between the transmitting-side active electrode and the transmitting-side passive electrode; and an electrostatic shielding element configured to reduce stray capacitance formed between Earth and at least one of the transmitting-side active electrode and the receiving-side active electrode when the power receiving device is placed on the power transmitting device wherein:

the transmitting-side active electrode comprises a first transmitting-side electrode and a second transmitting-side electrode, the voltage generating circuit is configured to apply a first voltage to the first transmitting-side electrode and a second voltage to the second transmitting-side electrode, and the first voltage and the second voltage are opposite in phase.

15. A power receiving device configured to receive power from a power transmitting device having a transmitting-side active electrode and a transmitting-side passive electrode, the power receiving device comprising:

a receiving-side active electrode positioned adjacent to the transmitting-side active electrode when the power receiving device is placed on the power transmitting device;

a receiving-side passive electrode positioned adjacent to the transmitting-side passive electrode when the power receiving device is placed on the power transmitting device;

an electrostatic shielding element section configured to reduce stray capacitance formed between Earth and at least one of the receiving-side active electrode and the transmitting-side active electrode when the power receiving device is placed on the power transmitting device;

a step-down circuit configured to decrease a voltage generated between the receiving-side active electrode and the receiving-side passive electrode; and a load circuit configured to receive the decreased voltage from the step-down circuit.

16. The power receiving device according to claim 15, wherein:

the receiving-side active electrode comprises a first receiving-side electrode and a second receiving-side electrode; and the step-down circuit is configured to decrease an output voltage from at least one of the first receiving-side electrode and the second receiving-side electrode.

* * * * *